(12) United States Patent
Ramu et al.

(10) Patent No.: US 8,706,881 B2
(45) Date of Patent: *Apr. 22, 2014

(54) AUTOMATIC REGISTRATION OF ENTERPRISE RESOURCES IN A DYNAMIC MODULE SYSTEM SERVICES REGISTRY

(75) Inventors: Jagadish P. Ramu, Bangalore (IN); Sanjeeb K. Sahoo, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/069,371

(22) Filed: Mar. 22, 2011

(65) Prior Publication Data

US 2012/0246316 A1 Sep. 27, 2012

(51) Int. Cl.
*G06F 15/173* (2006.01)
*G06F 9/44* (2006.01)

(52) U.S. Cl.
USPC .......................................... 709/226; 717/166

(58) Field of Classification Search
USPC ............................. 717/166, 175; 709/217, 226
See application file for complete search history.

(56) References Cited

U.S. PATENT DOCUMENTS

| | | | | |
|---|---|---|---|---|
| 5,901,315 | A * | 5/1999 | Edwards et al. | 717/124 |
| 6,603,769 | B1 * | 8/2003 | Thubert et al. | 370/401 |
| 6,684,241 | B1 * | 1/2004 | Sandick et al. | 709/220 |
| 7,206,805 | B1 * | 4/2007 | McLaughlin, Jr. | 709/203 |
| 7,716,663 | B2 | 5/2010 | Hayes, Jr. | |
| 7,774,757 | B1 * | 8/2010 | Awasthi et al. | 717/127 |
| 7,788,674 | B1 * | 8/2010 | Siegenfeld | 719/313 |
| 7,945,902 | B1 * | 5/2011 | Sahoo | 717/131 |
| 7,984,419 | B2 | 7/2011 | Fey | |
| 8,005,055 | B2 * | 8/2011 | Kwak et al. | 370/338 |
| 8,055,773 | B2 * | 11/2011 | Breiter et al. | 709/226 |
| 8,151,281 | B2 * | 4/2012 | Reed et al. | 719/328 |
| 8,209,220 | B2 * | 6/2012 | Mohammed et al. | 705/14.1 |
| 8,310,950 | B2 * | 11/2012 | Lofstrand et al. | 370/252 |
| 8,320,388 | B2 * | 11/2012 | Louati et al. | 370/401 |
| 8,365,138 | B2 * | 1/2013 | Iborra et al. | 717/104 |
| 2002/0100014 | A1 * | 7/2002 | Iborra et al. | 717/104 |
| 2002/0143960 | A1 * | 10/2002 | Goren et al. | 709/229 |
| 2003/0033398 | A1 * | 2/2003 | Carlson et al. | 709/223 |
| 2003/0110313 | A1 * | 6/2003 | Dochez et al. | 709/328 |
| 2003/0167455 | A1 * | 9/2003 | Iborra et al. | 717/105 |
| 2004/0233232 | A1 * | 11/2004 | Iborra et al. | 345/700 |

(Continued)

OTHER PUBLICATIONS

Gavin King et al, "Weld—JSR-299 Reference Implementation JSR-299: The new Java standard for dependency injection and contextual lifecycle management", Nov. 11, 2009, Weld.

(Continued)

*Primary Examiner* — Lynn Feild
*Assistant Examiner* — Michael A Chambers
(74) *Attorney, Agent, or Firm* — Robert C. Kowert; Meyertons, Hood, Kivlin, Kowert & Goetzel, P.C.

(57) ABSTRACT

A computer-implemented method, system, and medium are disclosed for implementing a hybrid application server. The server comprises an application server container, a dynamic module system, and a resources-exporter module deployed on the dynamic module system. The resources-exporter module is configured to detect that a system-level resource of the application server container has been deployed. In response to detecting that the container resource has been deployed, the resources-exporter is configured to register a proxy object for the system-level resource as a service in the dynamic module system.

20 Claims, 12 Drawing Sheets

(56) References Cited

U.S. PATENT DOCUMENTS

| | | | |
|---|---|---|---|
| 2004/0243881 A1* | 12/2004 | Wang et al. | 714/37 |
| 2005/0154785 A1* | 7/2005 | Reed et al. | 709/217 |
| 2006/0253588 A1* | 11/2006 | Gao et al. | 709/226 |
| 2007/0094673 A1* | 4/2007 | Hunt et al. | 719/321 |
| 2007/0271554 A1 | 11/2007 | Fletcher et al. | |
| 2007/0297350 A1* | 12/2007 | Eilam et al. | 370/255 |
| 2008/0209391 A1* | 8/2008 | Iborra et al. | 717/105 |
| 2008/0276231 A1 | 11/2008 | Huang et al. | |
| 2009/0070792 A1 | 3/2009 | Cable | |
| 2009/0094617 A1* | 4/2009 | Gruenewald et al. | 719/316 |
| 2009/0144514 A1* | 6/2009 | Lamantia et al. | 711/161 |
| 2009/0276767 A1 | 11/2009 | Brannen, Jr. et al. | |
| 2010/0046531 A1* | 2/2010 | Louati et al. | 370/401 |
| 2010/0082538 A1 | 4/2010 | Rentsch et al. | |
| 2010/0082777 A1* | 4/2010 | Montgomery et al. | 709/220 |
| 2011/0078672 A1* | 3/2011 | Stark et al. | 717/166 |
| 2012/0005663 A1* | 1/2012 | Burckart et al. | 717/166 |
| 2012/0054367 A1* | 3/2012 | Ramakrishnan et al. | 709/242 |
| 2012/0063458 A1* | 3/2012 | Klink et al. | 370/392 |
| 2012/0214441 A1* | 8/2012 | Raleigh | 455/406 |

OTHER PUBLICATIONS

"OSGi Service Platform Enterprise Specification, The OSGI Alliance," Release 4, Version 4.2, Mar. 2010, OSGI Alliance, 492 pages.
Sun Microsystems, Inc., "Java Platform, Enterprise Edition (Java EE) Specification, v6," Nov. 6, 2009, 264 pages.
U.S. Appl. No. 13/046,642, filed Mar. 11, 2011, all pages.
U.S. Appl. No. 13/046,639, filed Mar. 11, 2011, all pages.

* cited by examiner

AUTOMATIC REGISTRATION OF ENTERPRISE RESOURCES IN A DYNAMIC MODULE SYSTEM SERVICES REGISTRY

BACKGROUND

As software systems have become more complex, code modularity has become an increasingly important design goal. Building software systems using modular components enables developers to reuse code, modify software quickly when requirements evolve, mitigate costs of producing multiple versions, and reduce development time by integrating pre-written, third-party components.

Many tools and frameworks have been proposed for facilitating modular software development. For example, Java Enterprise Edition™ (Java EE) is a widely used application server environment for enterprise server programming in Java™. The platform includes a component container that provides a set of services, application programming interfaces (APIs), and protocols that facilitate modular software development. The container also provides runtime support, such as lifecycle management, security frameworks, deployment services, automatic threading, transaction management, and other services. A container that provides such services, such as the Java EE container, may be referred to herein generally as an application server container or component container. The components to which the container provides such services are said to be managed by the container.

Using Java EE standards, developers can define web-tier components (e.g., Servlets), business-tier components (e.g., Enterprise Java Beans™ or EJBs™), components for accessing enterprise information systems (e.g., JDBC™), and others, and assemble applications from these components. At runtime, the assembled application can be deployed on the container as a package of components (e.g., using a JAR). The container provides the application components with services, such as lifecycle management, security, deployment, threading, transaction management, persistence, remote invocation, context propagation, and others. By providing such services, an application server component container, such as that provided by Java EE, enables programmers to concentrate on developing application logic rather than on wiring components together and implementing commonly required and/or low-level functionality.

There has also been much interest in service-oriented architectures and dynamic module systems. A dynamic module system is a framework that allows components to be deployed as independent modules and to dynamically discover and use one another during runtime. Such systems are "dynamic" in that components may enter and/or exit the system independently of other components. For example, OSGi is a dynamic module system for building modular, service-oriented Java™ applications. OSGi provides a service registry where developers can register and unregister services. Each service listed by the service registry may have multiple implementations and an OSGi component may query the service registry to discover and retrieve various implementations of a particular service. In response to a service query, an OSGi container may determine an appropriate implementation that satisfies the query and return it to the querying component. Using the handle, the discovering object may then invoke the service. Related services are often deployed in OSGi as a group of implementing classes known as a bundle or module. Such a module may define a set of capabilities (i.e., service interfaces), requirements (i.e., dependencies), and classes (i.e., implementations). OSGi includes a lifecycle layer that enables modules to be dynamically installed, started, stopped, updated, and uninstalled during runtime, which enables reconfiguration without system downtime.

SUMMARY

A computer-implemented method, system, and medium are disclosed for implementing a hybrid application server. The server comprises an application server container, a dynamic module system, and a resources-exporter module deployed on the dynamic module system. The resources-exporter module is configured to detect that a system-level resource of the application server container has been deployed. In response to detecting that the container resource has been deployed, the resources-exporter is configured to register a proxy object for the system-level resource as a service in the dynamic module system. Thereafter, the proxy object is discoverable and invocable by components of the dynamic module system.

In some embodiments, the system-level resource may correspond to a pool of connections to a database (e.g., JDBC) or to other system-level resources. The system-level resource may be deployed according to a configuration parameter, which the resources-exporter may associate with the service as a service property. In response to detecting that the configuration parameter has been modified, the resources-exporter may modify the service property to reflect the modified configuration parameter.

When a client component invokes a service provided by the proxy object, the proxy object may discover the system-level resource by performing a lookup using a directory service of the application server container. The proxy object may then invoke an interface of the system-level resource that corresponds to the one invoked by the client.

When the system detects that the system-level resource is no longer deployed on the application server container, the resources-exporter may unregister the proxy object form the dynamic module system. The dynamic module system may be configured to notify one or more clients that the proxy object is unregistered.

Figure 1:
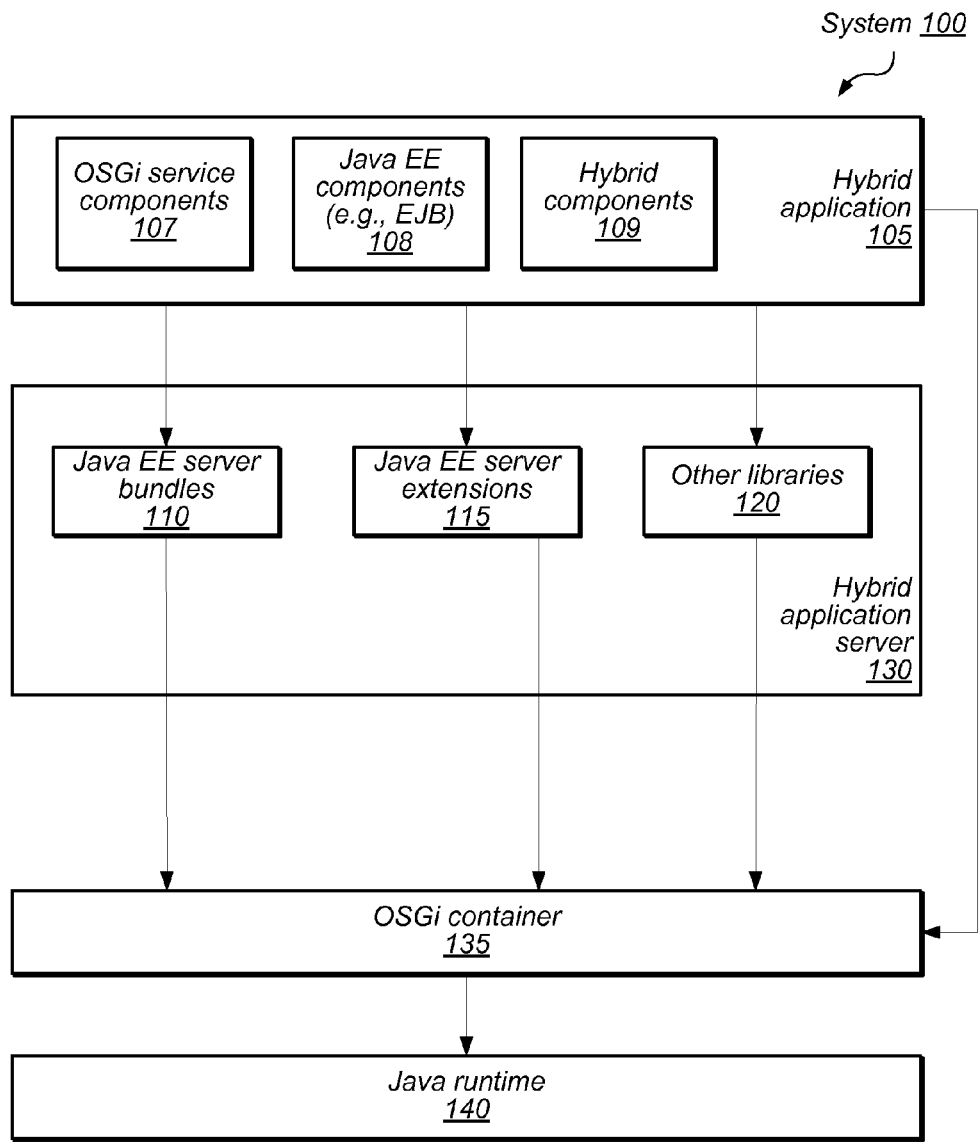
FIG. 1 is a block diagram illustrating a hybrid application deployed on a hybrid application server, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Application server component containers (e.g., that provided by Java EE) and dynamic module systems (e.g., OSGi) each provide valuable tools that help programmers develop and manage modular software applications. For example, enterprise services typically require transactional access to data systems such as relational database servers, message-oriented middleware, CORBA, ERP systems (e.g., SAP, PeopleSoft, etc.), legacy systems, and/or others, which may be integrated with a security policy of an underlying system. The Java EE component container provides well-established APIs for building services with transactional access to such data systems, whereas OSGi does not. On the other hand, OSGi provides a dynamic modular runtime that enables components to be inserted, discovered, updated, and removed dynamically at runtime. It is therefore desirable to build hybrid applications that can be deployed in an environment that integrates the benefits of an enterprise application server component container with those of a dynamic module system.

According to various embodiments, an application server may be deployed with both a component container usable to manage application components and a dynamic module system usable to provide dynamic services to those components. Thus, applications executing on the hybrid server may leverage both the benefits of a component container as well as those of the dynamic module system. Such applications may be referred to herein as hybrid applications and may be implemented as a group of independently deployable modules (or bundles) in the dynamic module system. As used herein, a bundle is a unit of deployment in a dynamic module system, such as OSGi.

In some embodiments, the application server may be a Java EE-compliant application server (e.g., GlassFish), which may itself be deployed as bundles of a dynamic module system (e.g., an OSGi implementation, such as Felix, Equinox, Knopflerfish, etc.). Although many of the embodiments described herein are illustrated in terms of a Java EE application server and an OSGi dynamic module framework, the systems and techniques described herein are not intended to be limited to those technologies alone. In recognition that particular standards evolve and that alternatives become available, it is intended that the embodiments described herein be applicable to any application server, component container, and dynamic module system.

FIG. 1 is a block diagram illustrating a hybrid application deployed on a hybrid application server, according to some embodiments. In the illustrated embodiment, hybrid application 105 is deployed on hybrid application server 130, which is itself deployed on an OSGi container 135 (e.g., Felix). OSGi container 135 may provide a dynamic module container that includes a service registry, dependency management, and/or lifecycle management as described above. In the illustrated embodiment of FIG. 1, the hybrid application 105, server 130, and OSGi container 135 are all implemented on a Java™ runtime container 140, which may provide a set of standard class libraries that implement the Java™ application programming interface.

According to FIG. 1, hybrid application server 130 comprises various components and libraries, such as Java EE server bundles 110, Java EE server extensions 115, and other libraries 120. In some embodiments, server 130 may itself be implemented as an OSGi application. For example, Java EE server bundles 110 may be a number of OSGi bundles that together implement a Java EE application server and/or various other server functionalities. Such functionality may implement a Java EE server standard. In addition to the standard implementation, extensions 115 may include third party OSGi bundles used to implement functionality beyond that defined by the standard server (i.e., in bundles 110) and libraries 120 may implement various other functionality usable by the server and/or hybrid applications 105.

According to FIG. 1, hybrid application 105 comprises various components, such as OSGi service components 107, Java EE components 108, and hybrid components 109. Any of components 107-109 may be organized into modules of hybrid application 105.

An OSGi service component, such as in 107, may be defined as part of an OSGi bundle that includes various classes implementing one or more services. An OSGi bundle may also include OSGi metadata that describes the implemented services and/or other configuration information usable to deploy the components. Hybrid application server 130 may use this metadata to deploy OSGi service components 107 as dynamic services in OSGi container 135.

According to the illustrated embodiment, a hybrid application may further comprise Java EE components 108. Java EE components may be written as self-contained, reusable components (e.g., EJBs, Servlets, etc.) that are deployable on an application server and are managed by a configurable Java EE container. Before deploying a Java EE component into production on the Java EE container, the application server 130 may verify that the component is well formed and in compliance with a Java EE specification.

The Java EE container may be implemented by application server 130 (e.g., in Java EE server bundles 110) and configured using various configuration files. A Java EE container may provide Java EE components with different services, such as security, transaction management, Java Naming and Directory Interface (JNDI) lookup functionality, remote connectivity, and/or other services. For example, the Java EE container may be configured with a given security model such that a managed component (e.g., an EJB) that is managed by the container prevents access by unauthorized users to restricted system resources. In another example, the container may implement a transaction model that allows programmers to define atomic transactions by specifying relationships among methods of one or more components that make up the transaction; the container may then ensure that all methods in the transaction are executed together as a single atomic unit without the need for the particular components to implement the low-level atomicity mechanisms. In some embodiments, the container may expose lookup interfaces (e.g., JNDI) that provide the managed components with a unified interface to various naming and directory services in an enterprise. Similarly, a container may also provide Java EE components with interfaces to remote components, such that a Java EE component can transparently access a remote component as though it is local.

Because the Java EE container provides a configurable context in which components execute, application components can be made to behave differently based on the particular container configuration in which they are deployed. For example, a particular EJB may have security settings that allow it a certain level of access to a database in one production environment and another level in a different production environment. Therefore, programmers can develop application components that are modular and reusable to implement different behavior as determined by the particular container in which they are deployed.

In some embodiments, a container may also provide other services, such as enterprise bean and servlet lifecycle management, database connection resource pooling, data persistence, dependency injection services, and provide access to various other Java EE container APIs. In some embodiments, application server 130 may implement multiple containers and/or sub-containers, such as separate EJB and web containers for managing business logic components (e.g., EJBs) and web components (e.g., JSPs/Servlets) respectively.

In some embodiments, multiple ones of Java EE components 108 may be bundled together as an archive (e.g., JAR file). Such an archive may include multiple classes implementing one or more Java EE components. The archive may also include various Java EE metadata that describes deployment settings of the one or more Java EE components. For example, the Java EE metadata may be declared in an XML-file (i.e., a deployment descriptor) that provides deployment metadata such as transaction attributes and security authorizations for the Java EE components. Therefore, an administrator may change the deployment descriptor to implement new functionality without the need to modify the source code implementing the Java EE components themselves. At runtime, server 130 may read the deployment descriptor and act upon Java EE components 108 accordingly.

In various embodiments, different types of Java EE components 108 may be packaged in different archives that include different metadata. For example, EJBs may be archived in a JAR archive that includes an EJB-specific deployment descriptor while JSPs, servlets, image files, and/or other web-tier components may be packaged in a WAR archive that includes a web-specific deployment descriptor.

In addition to (or instead of) deploying components that take advantage of either the OSGi framework or the Java EE framework, it may be desirable for a hybrid application to deploy hybrid components (e.g., 109) that can take advantage both of the benefits provided by the OSGi container 135 and of those provided by the Java EE container (implemented by server 130). For example, a hybrid component may be deployed as a Java EE component (which is managed by and can take advantage of a Java EE container implemented in server 130), but that are also visible as OSGi services managed by OSGi container 135. Such a component may take advantage of being a Java EE-managed component (e.g., transaction management, security framework, dependency injection framework, etc.) and also of being an OSGi-managed service (e.g., modularity, dynamic, service-oriented architecture, etc.). Accordingly, hybrid components 109 may be implemented as part of Java EE components 108 and/or of OSGi service components 107.

In FIG. 1, hybrid application 105 includes one or more hybrid components 109, which are implemented as both OSGi service components and Java EE components. In various embodiments, hybrid components 109 may correspond to a hybrid module and/or an entire hybrid application. Hybrid components 109 may be packaged together in a hybrid archive that includes various classes, OSGi metadata, and Java EE metadata.

Figure 2:
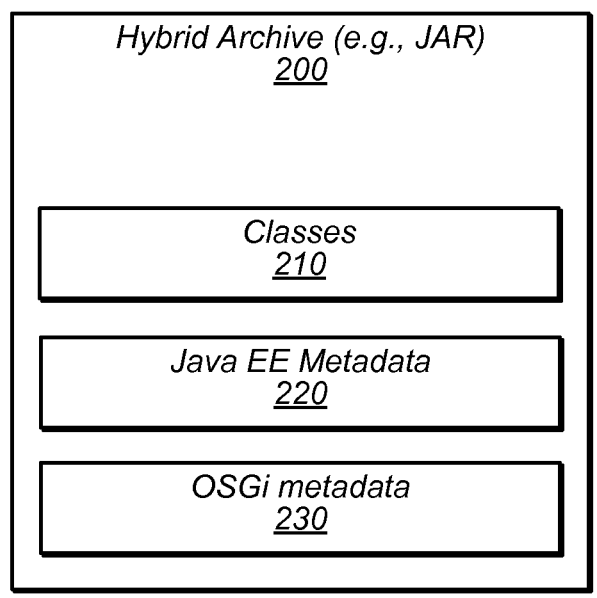
FIG. 2 is a block diagram depicting elements of a hybrid archive usable to deploy one or more hybrid components, modules, and/or applications on a hybrid applications server, according to some embodiments.

FIG. 2 is a block diagram depicting elements of a hybrid archive usable to deploy one or more hybrid components, modules, and/or applications on a hybrid applications server, according to some embodiments. In some embodiments, the hybrid archive may be packaged as a single file, such as a JAR file.

According to the illustrated embodiment, hybrid archive 200 includes classes 210. Classes 210 may include compiled code, source code, byte-code and/or any other encoding of the object classes that implement application functionality. For example, classes 210 may implement various Java EE components (e.g., EJBs), which may be configured to run within and be manageable by a Java EE container. Components defined in classes 210 may be configured to expose different interfaces and/or services. Hybrid archive 200 also includes Java EE metadata 220. Java EE metadata 220 may describe deployment settings of the Java EE components defined by classes 210, such that those components may be deployed on a Java EE container. In some embodiments, the Java EE metadata may be analogous to that used to deploy Java EE components 108 of FIG. 1. For example, the Java EE metadata may be declared in an XML-file of the archive (i.e., a deployment descriptor) that provides deployment metadata such as transaction attributes and security authorizations for the Java EE components. In some embodiments, some or all of Java EE metadata 220 may be expressed using annotations within classes 210 rather than only in a deployment descriptor. Java EE metadata 220 may enable the Java EE components defined in classes 210 to be deployed into a Java EE container.

Hybrid archive 220 also includes OSGi metadata 230. OSGi metadata 230 may describe deployment settings of one or more services exposed by classes 210, such that those services may be deployed into an OSGi container, such as 135 in FIG. 1, as an OSGi bundle. In various embodiments, OSGi metadata 230 may include a manifest file describing the contents of archive 200 and/or other information about the bundle, such as interfaces to the services the bundle will expose, dependency information, a unique identifier for the bundle, a human-readable name, the name of an activator class, a class path, and/or other metadata usable to deploy classes 210 as an OSGi service. In some embodiments, OSGi metadata 230 may further include optional documentation, such as that commonly included in an OSGI-OPT directory of OSGi bundles.

In various embodiments, Java EE metadata 220 and OSGi metadata 230 may be specified in separate files, together in a single file, using annotations within classes 210, or any combination thereof. For example, in some embodiments, a single deployment descriptor file may contain portions of Java EE metadata 220 and OSGi metadata 230, such that some common metadata (e.g., manifest of classes 210) need not be repeated in separate locations.

As describe above, a hybrid archive, such as 200, may be used to deploy a hybrid module, hybrid application, and/or various hybrid components. Such components may utilize both the benefits of the Java EE container and those of the OSGi container. For example, in some embodiments, hybrid archive 200 may be used to package and deploy one or more OSGi-enabled Java EE components, such as EJBs. In some embodiments, deploying components in such an archive may include deploying components on both the OSGi container and Java EE container. Therefore, such a hybrid archive may be considered an OSGi-enabled Java EE bundle.

Figure 3:
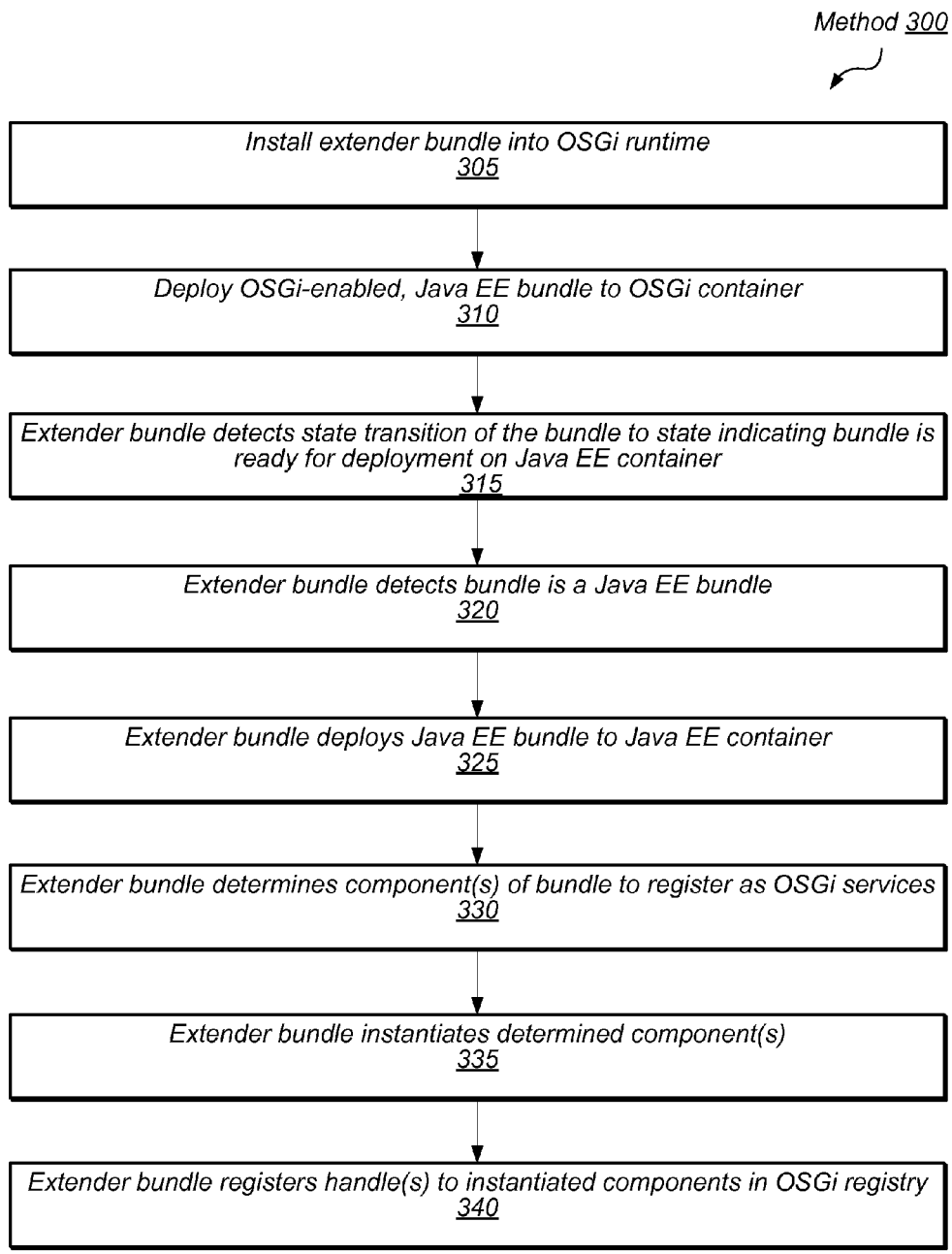
FIG. 3 is a flow diagram illustrating a method for deploying an OSGi-enabled, Java EE bundle, according to some embodiments.

FIG. 3 is a flow diagram illustrating a method for deploying an OSGi-enabled, Java EE bundle, according to some embodiments. In various embodiments, the method may be executed by a hybrid application server, such as server 130 of FIG. 1, and/or by additional software support mechanisms.

According to the illustrated embodiment, method 300 begins by installing an extender bundle in the OSGi runtime, as in 305. In some embodiments, the extender bundle may be a component or module packaged as an OSGi bundle. Such a bundle may be distributed as part of a hybrid application server.

Once the extender bundle is deployed on the OSGi container, it may listen for state transitions of OSGi-enabled Java EE bundles to determine when such a bundle has been deployed on the OSGi container. In some embodiments, the extender bundle may utilize built-in notification mechanisms of the OSGi container to detect deployment of OSGi-enabled Java EE bundles. For example, the extender bundle may register its interest with the OSGi container in receiving state transition notifications of newly deployed bundles. When the extender bundle receives notification of a newly deployed OSGi bundle, the extender bundle may examine the newly deployed bundle to determine whether the newly deployed bundle is a hybrid that should be deployed in the Java EE container.

According to the illustrated embodiment, after the extender bundle is installed in 305, an OSGi-enabled Java EE bundle is deployed to the OSGi container in 310. Such a bundle may include both OSGi and Java EE metadata and be packaged in a hybrid archive, such as 200 of FIG. 2.

Figure 4:
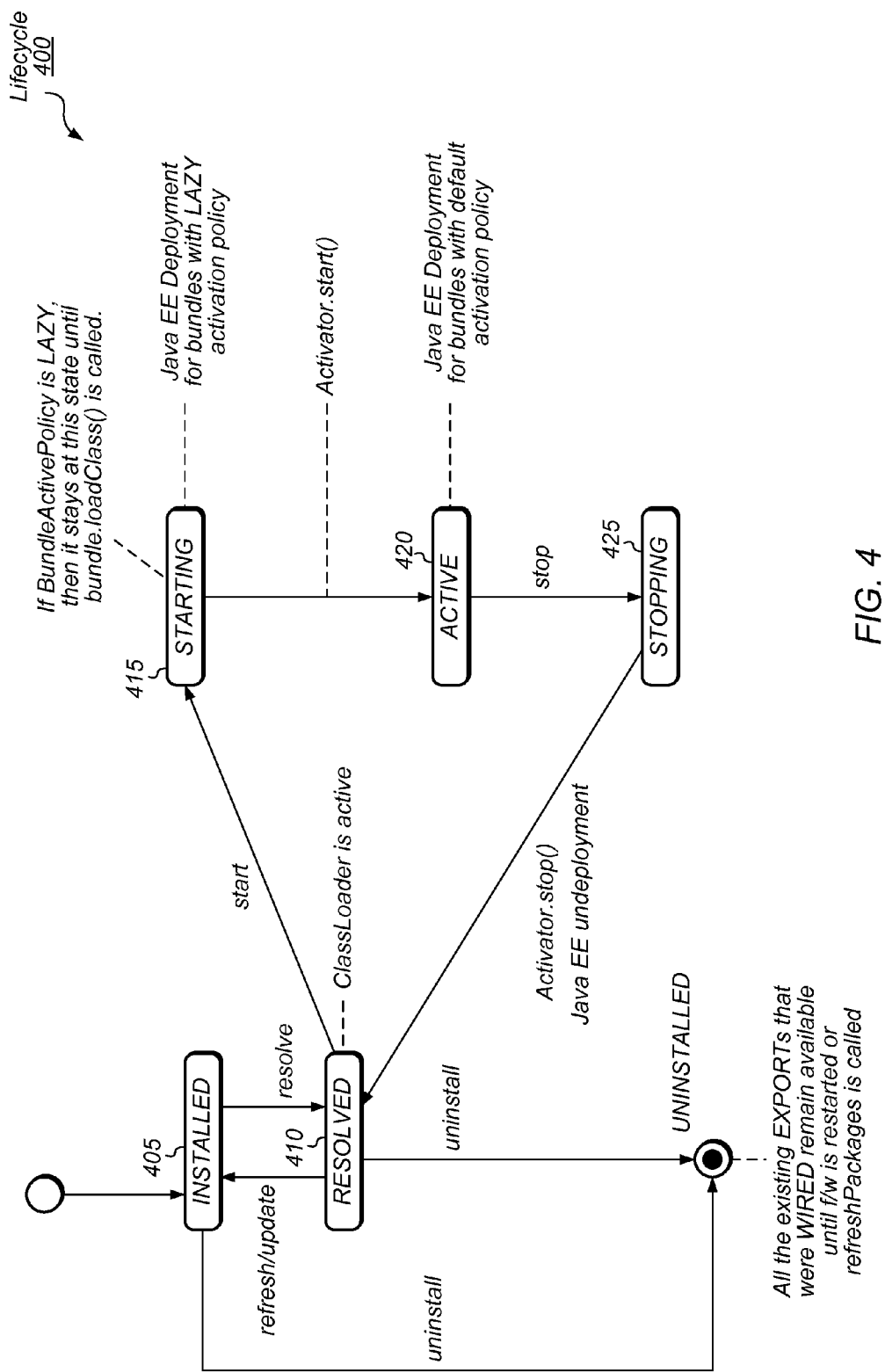
FIG. 4 is an annotated diagram illustrating an example bundle lifecycle in an OSGi container, according to some embodiments.

After or while the OSGi-enabled Java EE bundle is deployed (as in 310), the extender bundle receives event notifications regarding the status of the OSGi-enabled Java EE bundle. In 315, the extender bundle determines that the OSGi-enabled Java EE bundle is ready to be deployed to the Java EE container. The specific details of when a bundle is ready may vary across bundles and/or dynamic module system implementations. For example, in various embodiments, a bundle may be ready when the OSGi container has resolved all of the bundle's dependencies and/or when the container has invoked one or more appropriate activation methods of the bundle. FIG. 4 and the accompanying description below illustrate how the extender bundle may determine, as in 315, that an OSGi-enabled Java EE component is ready to be deployed to the Java EE container, according to some embodiments.

FIG. 4 is an annotated diagram illustrating an example bundle lifecycle in an OSGi container, according to some embodiments. FIG. 4 is annotated to denote how the extender bundle may determine that a deploying bundle is "ready" at different points in its lifecycle, which may depend on an activation policy associated with the deploying bundle.

According to FIG. 4, an OSGi bundle may start in INSTALLED state 405, where it has been detected and is waiting for all of its dependencies to be resolved. That is, the OSGi framework attempts to find each class on which the installed bundle depends (e.g., that the installed bundle references). Once all of a bundle's dependencies are resolved, the bundle enters the RESOLVED state 410. In some embodiments, the framework moves the bundle into RESOLVED state 410 after ensuring that the runtime environment meets or exceeds the environment required by the bundle and dependencies (e.g., packages imported by the bundle or other bundles required by the bundle) are present and either in the RESOLVED state 410 themselves or can be resolved at the same time as the bundle.

According to the illustrated embodiment, the STARTING state 415 is a transitional state between RESOLVED state 410 and ACTIVE state 420. During the STARTING state 415, the container may create the resources required by the bundle. When the resources are created, the container may call the start( ) function on the bundle's activator (if one is provided), as indicated by the transition to ACTIVE state 420. If the bundle has an activation policy, the bundle may remain in the STARTING phase 415 until the bundle is activated according to its activation policy. For example, if the bundle has a LAZY activation policy (i.e., a policy mandating that the bundle be activated upon the first successful request to load a class from that bundle), then the bundle may not become active until the first successful request to load a class from the bundle.

Once a bundle is activated, it may enter ACTIVE state 420 and become ready to be invoked and perform functionality defined by its classes. Services in an OSGi container can be stopped and started dynamically, such as by invoking a stop method on the bundle's activator. While a bundle is being stopped (e.g., after the stop method is called on the activator, but before the stop method returns), the bundle may be in STOPPING stage 425. Once the container fully stops the bundle, the bundle may return to the RESOLVED state 410.

According to the illustrated embodiment, determining when a given bundle is ready for deployment to the Java EE container may depend on the given bundle's activation policy. For example, if the bundle has a default activation policy, then the extender bundle may determine that the given bundle is ready when the given bundle enters the ACTIVE state 420. However, if the given bundle has a lazy activation policy, then the extender bundle may determine that the given bundle is ready when it is in the STARTING state.

In 315 of FIG. 3, the extender bundle detects a state transition that indicates the bundle is ready to be deployed to the Java EE container. In 320, the extender bundle examines the bundle to determine whether it is a Java EE bundle. For example, in 320, the extender bundle may examine the bundle metadata to determine if it contains Java EE component metadata (e.g., 220 of hybrid archive 200) that would allow one or more components in the bundle to be deployed as Java EE components in a Java EE container.

In response to determining that the bundle is an OSGi-enabled, Java EE bundle (as in 320) and is ready for deployment (as in 315), the extender bundle deploys the Java EE bundle to the Java EE container, as in 325. In 330, the extender determines whether the newly deployed OSGi-enabled Java EE bundle contains any components that should be registered with the OSGi container as services. For example, in some embodiments, the OSGi-enabled Java EE bundle may include metadata (e.g., in an "Export-EJB" header) that indicates various Java EE components (e.g., EJBs) and/or interfaces to expose via OSGi. In different instances, the metadata may indicate that all, none, or some subset of the components and/or interfaces defined in the Java EE bundle should be exposed as OSGi services.

Once the extender bundle has determined one or more Java EE components or interfaces to expose as OSGi services (as in 330), the extender instantiates the components as objects in the Java EE container, as in 335. In 340, the extender bundle registers the instantiated components (or references to the instantiated components), in the OSGi service registry, as in 340, so that the components are available for clients to discover and use. In some embodiments, registering a component may comprise registering all the component interfaces of the components as OSGi service interfaces.

In some embodiments, the extender bundle may determine whether a given Java EE component meets one or more deployment criteria, such as compatibility with the OSGi scoping model, before deploying the component as OSGi service. For example, an EJB that is designated as "stateful" is typically created by and/or for a given client, performs work on behalf of the client, and maintains state between invocations by the client. However, an OSGi scoping model may only be able to support singleton or singleton-per-bundle services. Because such services may be shared between multiple bundles, it may be incompatible to back such a service with a stateful bean. In some embodiments, the extender bundle may detect such scoping incompatibilities and avoid registering the incompatibly scoped Java EE component as an OSGi service.

Once a Java EE component interface is registered as an OSGi service in the OSGi service registry, the component may be available both as a Java EE component managed by the Java EE container and as an OSGi service available via the OSGi registry and managed by the OSGi container. The fact that the OSGi service is backed by a Java EE component may be transparent to clients who may discover and access Java EE-backed services in the OSGi service registry in the same manner as discovering and accessing normal OSGi services.

Figure 5:
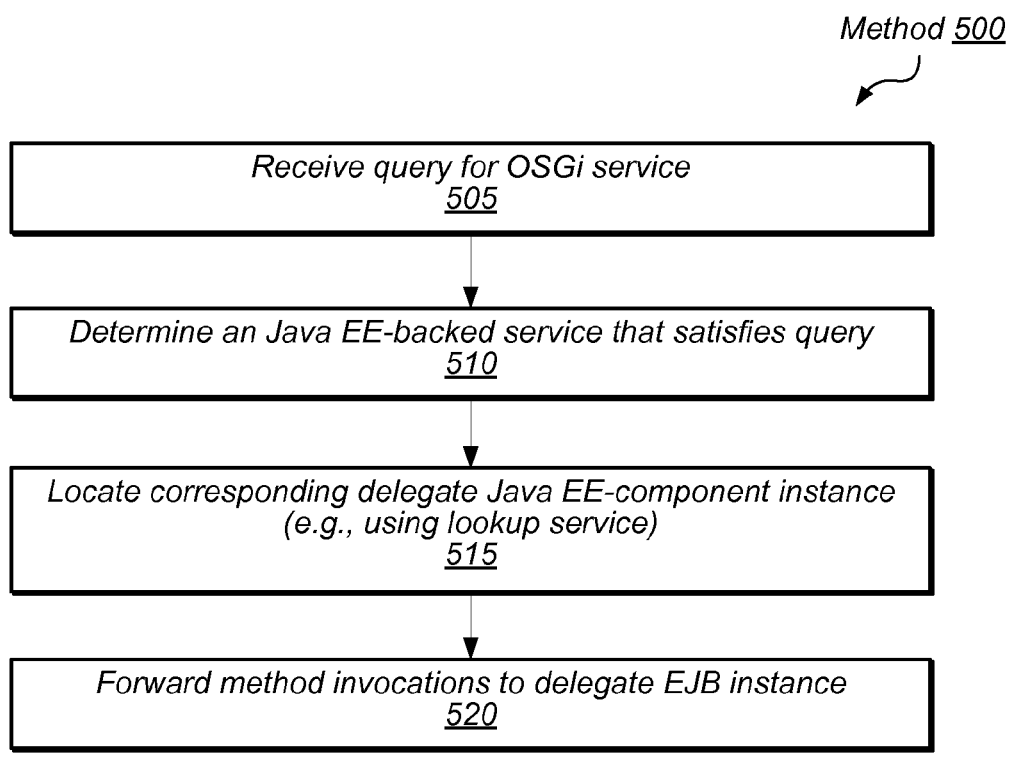
FIG. 5 is a flow diagram illustrating a method of a hybrid application server interacting with a client to serve a Java EE-backed OSGi service, according to some embodiments.

FIG. 5 is a flow diagram illustrating a method of a hybrid application server interacting with a client to serve a Java EE-backed OSGi service, according to some embodiments. In some embodiments, method 500 may be performed by a hybrid application server (e.g., 130 of FIG. 1) that has deployed an OSGi-enabled Java EE bundle, as in method 300 of FIG. 3. However, in various embodiments, different portions of method 500 may be performed by different components of the application server and/or by other libraries. For example, the query for an OSGi service, as in 505, may be handled by the OSGi container and/or by other associated components.

According to the illustrated embodiment, method 500 begins when the OSGi container receives a query for an OSGi service, as in 505. For example, in some embodiments, a client component may use a lookup service provided by its bundle context to query the OSGi container for a particular service. In some embodiments, the query may include a variety of selection criteria that the OSGi container can use to identify the appropriate service, such as a class name and/or additional tags.

In 510, the OSGi container uses the query data to determine the Java EE-backed service requested by the client component. In some embodiments, the OSGi container may locate the proxy handle registered by the extender bundle for the Java EE-component.

After determining the Java EE-backed service in 510, the server locates the corresponding delegate Java EE-component instance that backs the service, as in 515. In some embodiments, the server may locate the appropriate Java EE component by performing a lookup using a lookup interface, such as JNDI. For example, the server may use the portable JNDI name of the Java EE component to perform a JNDI lookup. Once the server discovers the delegate Java EE component (as in 515), it may forward invocations of the service to the delegate Java EE component for processing, as in 520.

As described with regard to FIG. 5, a client may utilize a Java EE-component backed OSGi service transparently as though it were a normal OSGi service. However, because the service is backed by a Java EE component executing in a Java EE container, the backing component still enjoys the benefits of Java EE container management. For example, if an OSGi client begins a transaction using the OSGi/JTA API, then a method invocation of the underlying Java EE component (e.g., an EJB) occurs in the context of the same transaction, which may allow the Java EE component developer to control the transactional behavior of the component through transactional attributes.

Figure 6:
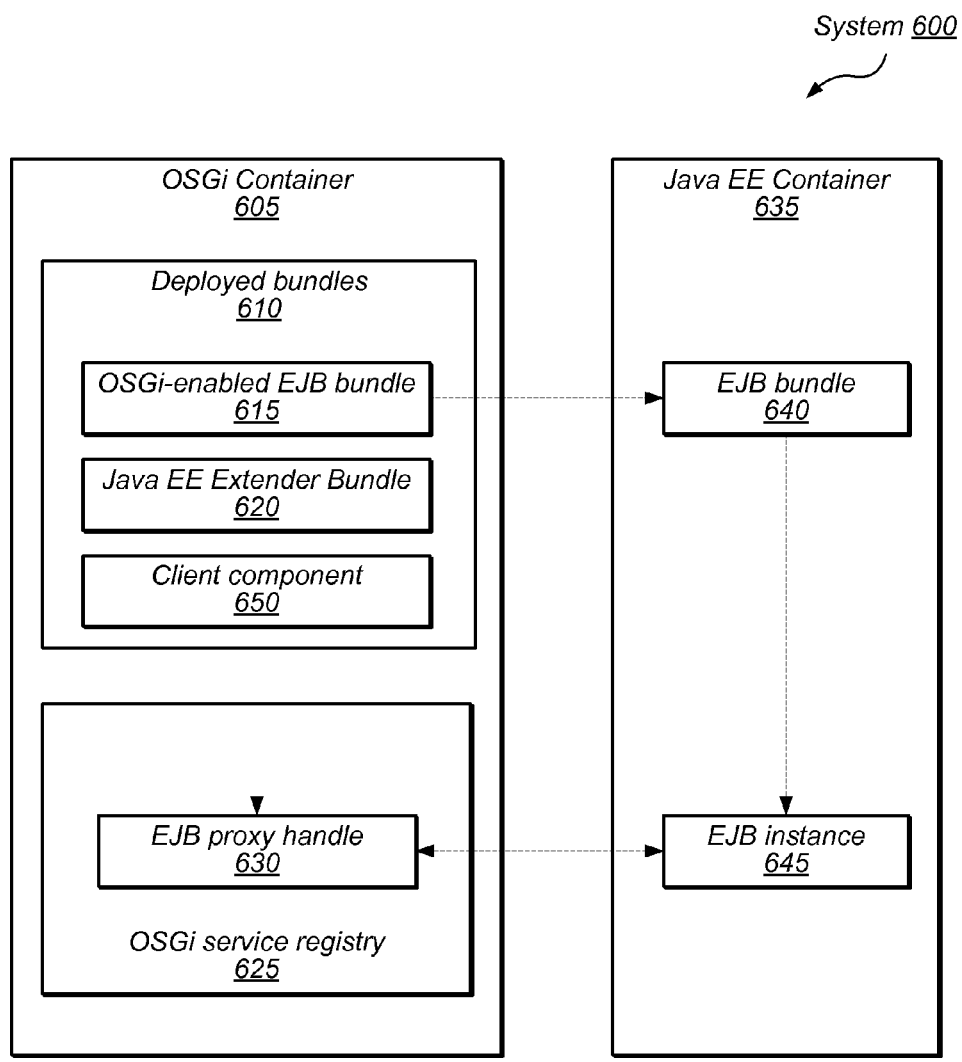
FIG. 6 is a block diagram illustrating components of an application server configured to implement OSGi services backed by a Java EE component, according to some embodiments.

FIG. 6 is a block diagram illustrating components of an application server configured to implement OSGi services backed by a Java EE component, according to some embodiments. In some embodiments, system 600 of FIG. 6 may correspond to hybrid application server 130 of FIG. 1.

According to the illustrated embodiment, system 600 comprises OSGi container 605 and Java EE container 635. However, in various embodiments, OSGi container 605 may correspond to a container of another dynamic module system and Java EE container 635 may correspond to a component container other than Java EE.

OSGi container 605 comprises a variety of deployed bundles 610, including an OSGi-enabled EJB bundle 615 and Java EE extender bundle 620. OSGi-enabled EJB bundle 615 may be a type of OSGi-enabled Java EE bundle (as described in reference to FIGS. 3-5) that contains EJB components. In some embodiments, OSGi-enabled EJB bundle 615 may be deployed using a hybrid archive, such as 200, that includes both Java EE and OSGi metadata, such as 220 and 230.

In some embodiments, Java EE extender bundle 620 may be configured to listen for state transition events of bundles on OSGi container 605, as described herein with reference to FIG. 4, and to deploy bundle 615 onto Java EE container 624 when bundle 615 becomes ready. For example, in response to detecting that OSGi-enabled EJB bundle 615 is ready for deployment (e.g., as described in reference to FIG. 4) and that the bundle is an OSGi-enabled EJB bundle (e.g., as described in reference to FIG. 3), Java EE extender bundle 620 may deploy bundle 615 onto Java EE container 625 as EJB bundle 640.

Java EE extender bundle 620 may read deployment metadata of EJB bundle 640 to determine which EJBs and/or interfaces should be exposed as OSGi services. For example, Java EE extender bundle 620 may determine which EJBs and/or services of EJBs to register as OSGi services by reading an "Export-EJB" header in the metadata of EJB bundle 640. In various instances, the header may indicate that all EJBs should be made available as OSGi services, that none should be, that only a subset should be (e.g., by class name), and/or that only a subset of methods of any given EJB should be registered.

In response to determining that a given EJB (i.e., Java EE component) defined by EJB bundle 640 should be made available as an OSGi service, extender bundle 620 may create a corresponding EJB instance to back such a service. For example, in the illustrated embodiment, Java EE extender bundle 620 has instantiated EJB instance 645 from its definition in EJB bundle 640.

In system 600, extender bundle 620 creates EJB proxy handle 630, which corresponds to EJB instance 645, and registers it in OSGi service registry 625. The proxy handle 630 may be registered using the EJB class name and/or various other metadata that enables clients to discover the service by querying OSGi registry 625. The fact that the service is an EJB-backed service may be transparent to clients, which may discover and invoke the service just like any other OSGi service. When a client invokes the service provided by EJB proxy handle 630, the server may transparently locate the corresponding delegate EJB instance 645 using a lookup service, such as JNDI, and forward the method invocation to that delegate.

As discussed above, a Java EE container, such as 635, may be configured to expose a variety of system-level resources for use by applications executing in the container. Such resources may include database connection pools (e.g., JDBC), messaging services (e.g., JMS), naming directory lookup services (e.g., JNDI), and/or other Java EE resources (e.g., JavaMail, other custom resources, etc.). The resources may be accessed by one or more applications executing in the container. Thus, the one or more applications may take advantage of various resources without need to re-implement the functionality. A system-level resource provided by a Java EE container may also be referred to herein as a Java EE resource.

For example, an administrator of the Java EE container may create a JDBC connection pool as a system-level resource. The resource comprises a pool of connections to a given database that one or more applications in the container may use. The administrator may configure the JDBC resource by providing information necessary to reach the target database as well as various resource parameters, such as a minimum, maximum, and/or target number of connections for the container to maintain in the pool. The container may then create the declared pool and make it available to one or more web application components via a given interface. When an application requires access to the given database, the application may request a connection from the container-managed pool rather than creating a new connection to the JDBC resource each time it is needed. Meanwhile, the Java EE container may transparently manage the pool such that it contains an ideal number of connections, given the prevailing workload.

In some embodiments, a hybrid server may be configured to expose system-level container resources, such as a JDBC connection pool, as dynamic services. Thus, a module in a dynamic module system may discover and use a container resource. Various examples and illustrations are discussed below.

Figure 7:
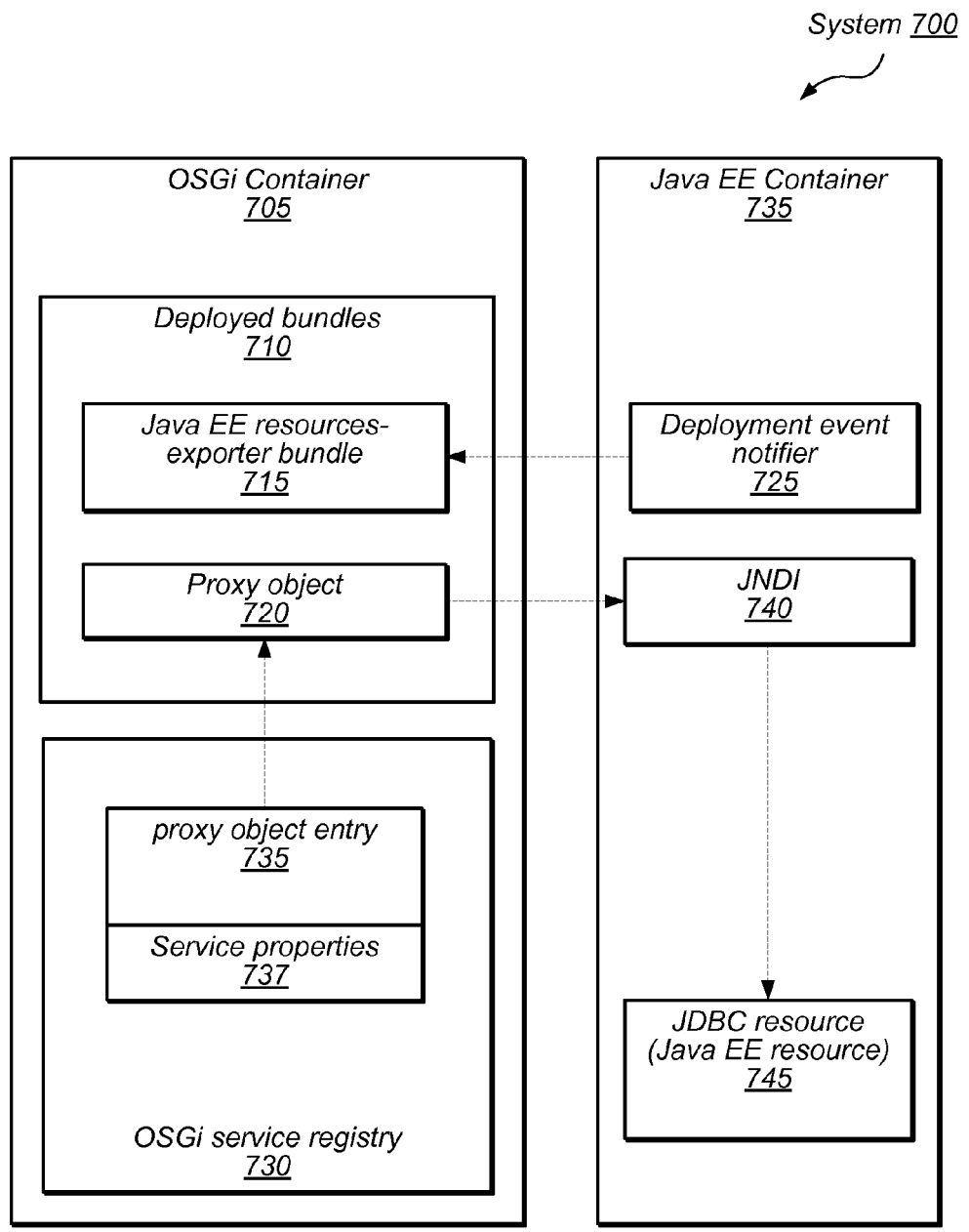
FIG. 7 is a block diagram illustrating components of a hybrid application server configured to implement OSGi services backed by Java EE, system-level resources, according to some embodiments.

FIG. 7 is a block diagram illustrating components of a hybrid application server configured to implement OSGi services backed by Java EE, system-level resources, according to some embodiments. In some embodiments, system 700 of FIG. 7 may correspond to hybrid application server 130 of FIG. 1 and/or to system 600 of FIG. 6.

According to the illustrated embodiment, system 700 includes an OSGi container 705 and Java EE container 735. However, as in system 600, OSGi container 705 may correspond to a container of another dynamic module system and Java EE container 735 may correspond to a component container other than Java EE.

An administrator may deploy Java EE resources onto Java EE container 735. For example, an administrator may create a JDBC resource, such as 745. As described above, the administrator may provide various configuration information and/or parameters, such as the minimum, maximum, and/or ideal number of connections to maintain in a connection pool of the JDBC resource 745. Once the resource is deployed on the Java EE container 735, Java EE components executing in Java EE container 735 may access the JDBC resource via a given interface (e.g., javax.sql.DataSource).

In the illustrated embodiment, Java EE container 735 includes a deployment event notifier 725, which may be configured to detect deployment events of Java EE system resources (e.g., JDBC 745, JMS, JavaMail, etc.) and to notify interested listeners. Deployment events may include a Java EE resource being deployed, modified, and/or deleted. The notifier 725 may detect a creation event in response to an administrator first creating the JDBC resource. The notifier may subsequently detect a modification event in response to an administrator modifying any parameters of the resource (e.g., max number of connections). The notifier may also detect a deletion event in response to an administrator removing the resource from the Java EE container, such that components may no longer use the resource.

In some embodiments, one or more listeners may register their respective interests with event notifier 725. The registration may specify the types of events about which the listener is interested in being notified. When such an even occurs, notifier 725 may notify the interested listeners of the event.

In the illustrated embodiment, deployment event notifier 725 is configured to notify Java EE resources-exporter bundle 715 of various resource deployment events. Java EE resources-exporter bundle 715 is one of deployed bundles 710 in OSGi container 705. Thus, when an administrator creates, modifies, and/or deletes JDBC resource 745, event notifier 725 detects the event and notifies resources-exporter bundle 715.

In response to receiving notification that a Java EE resource has been created, resources-exporter bundle 715 may create a proxy object (such as 720) for the resource and register the proxy object as a service in OSGi service registry 730. According to the illustrated embodiment, exporter 715 has registered proxy object 720 in OSGi registry 730, as indicated by entry 735. In some embodiments, exporter bundle 715 may register the proxy object using a standard interface corresponding to the underlying Java EE resource. Furthermore, the exporter may associate the proxy object entry with various service properties (e.g., 737), which may reflect parameters of the Java EE resource (e.g., class name, JNDI name, or any other configuration parameters.

Once the proxy object is registered in the OSGi registry, OSGi clients may query the registry to discover, acquire a handle to, and invoke methods exposed by the proxy object. In response to being invoked, the proxy object may locate the underlying Java EE resource (e.g., using a JNDI lookup) and invokes the resource on behalf of the client. Thus, OSGi clients may take advantage of a Java EE resource, such as a JDBC connection pool.

Figure 8:
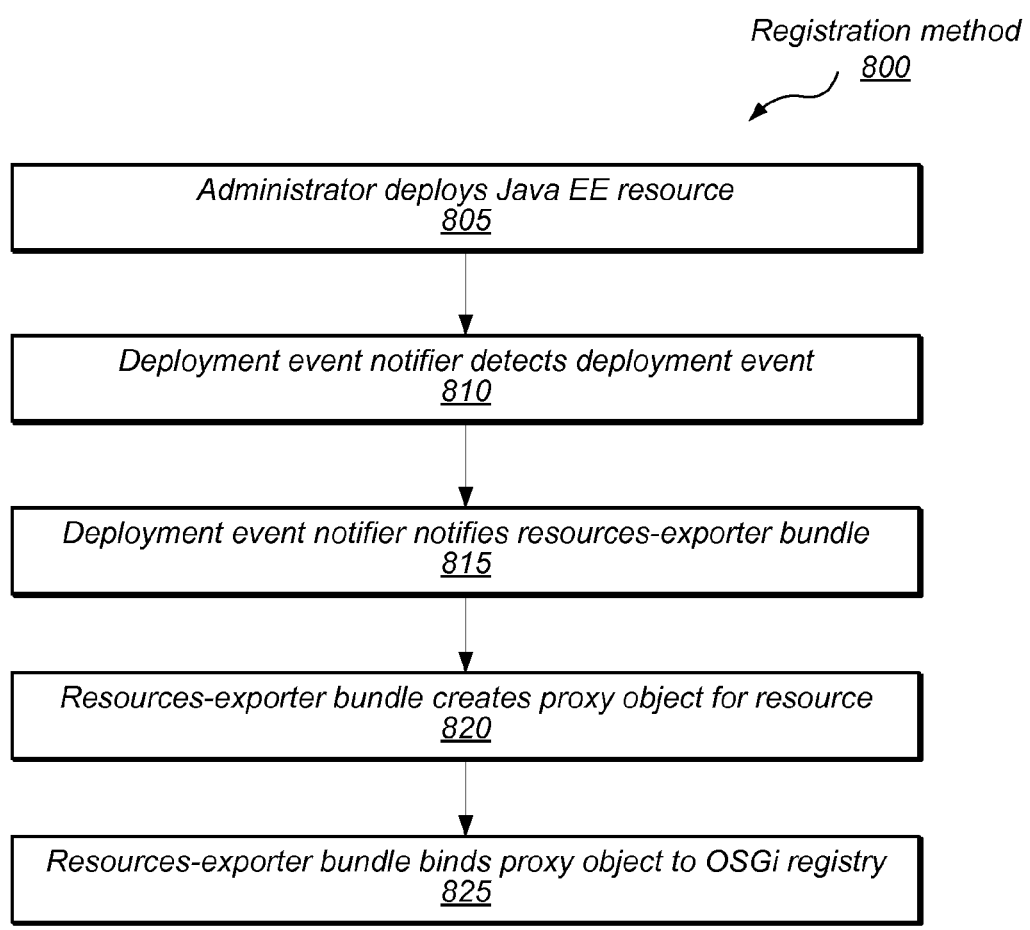
FIG. 8 is a flow diagram illustrating a method for automatically registering a Java EE resource in an OSGi service registry, according to some embodiments.

FIG. 8 is a flow diagram illustrating a method for automatically registering a Java EE resource in an OSGi service registry, according to some embodiments. Method 800 may be executed by a hybrid application server, such as system 700.

Registration method 800 begins when an administrator deploys a system-level resource, such as JDBC resource 745 in Java EE container 735. The JDBC resource may include various configuration information and/or parameters, such as the minimum, maximum, and/or ideal number of connections to maintain in a connection pool of the JDBC resource.

In 810, a deployment event notifier (e.g., 725) detects the deployment event and, in 815, notifies a resource-exporter bundle (e.g., 715) of the deployment event. In response to being notified of the event, the resources-exporter creates a proxy object (e.g., 720) for the resource. The resources-exporter may configure the proxy to locate and invoke the Java EE resource. For example, the resources-exporter may provide the proxy object with a JNDI name of the Java EE resource. Thus, the proxy object may perform a JNDI lookup in the Java EE container to locate the underlying Java EE resource.

In 825, the resources-exporter bundle binds the proxy object the OSGi registry. Binding the proxy to the OSGi registry may comprise registering the proxy as one or more service interfaces in the OSGi registry, such that OSGi clients may query the registry to discover the proxy. In some embodiments, the resources-exporter bundle may register the proxy object using a standard interface of the underlying Java EE resource. For example, the resources-exporter may register a proxy object for a JDBC resource as a javax.sql.DataSource interface, a proxy object for a JMS Queue resource as a javax.jms.Queue interface, a proxy object for a JMS Topic resources as a javax.jms.Topic interface, a proxy object for a JMS Connection Factory resource as ajavax.jms.queueConnectionFactory or javax.jms.TopicConnectionFactory or javax.jms.ConnectionFactory interface, and so on. The resources-exporter may also associate the registered service interface with various service properties (e.g., 737), any of which may reflect configuration parameters of the underlying Java EE resource.

Figure 9:
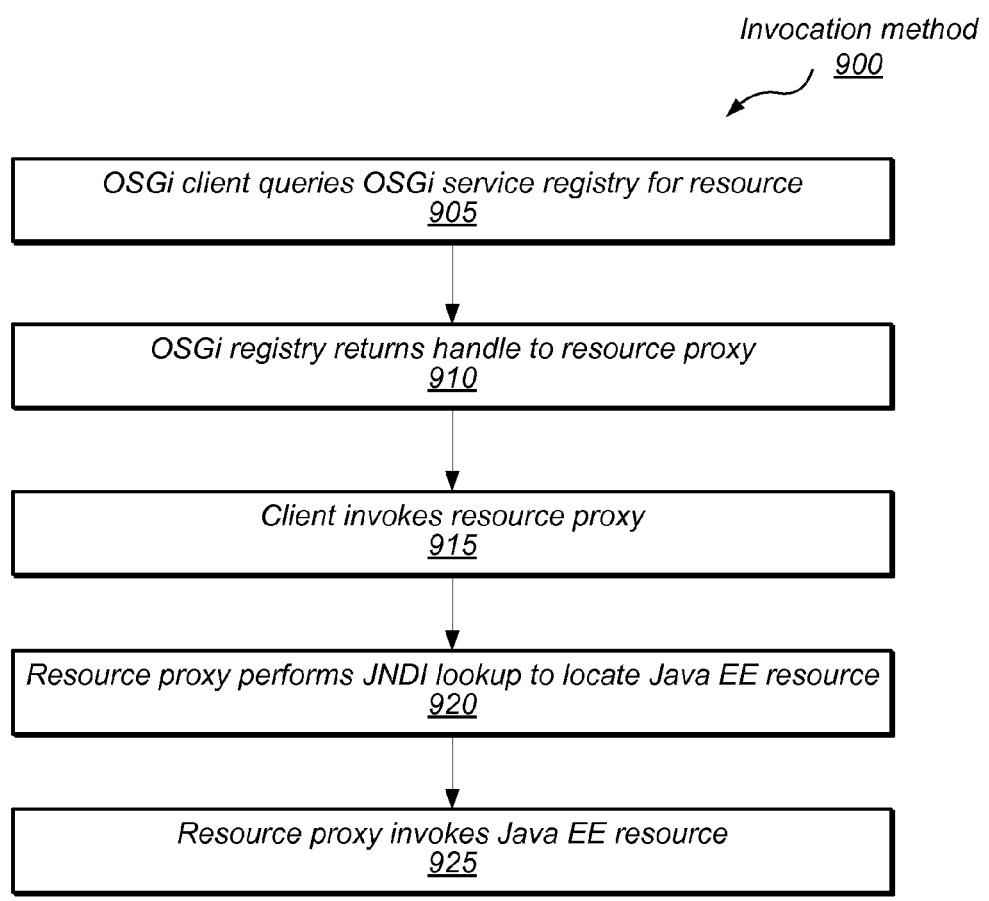
FIG. 9 is a flow diagram illustrating a method for an OSGi client discovering and invoking a Java EE resource, according to some embodiments.

FIG. 9 is a flow diagram illustrating a method for an OSGi client discovering and invoking a Java EE resource, according to some embodiments. Invocation method 900 may be performed using a system such as 700 of FIG. 7.

In 905, an OSGi client (e.g., 650) queries an OSGi registry (e.g., 730) for a service provided by a Java EE resource (e.g., JDBC resource 745). The query may include an interface name and/or various other qualifiers. For example, the query may specify that the returned object must be associated with service properties (e.g., 737) that match one or more parameters.

In 910, the OSGi registry responds to the query by returning a handle to a matching proxy object (e.g., 720). As described above, the handle may be a reference to the proxy object.

In 915, the client uses the returned handle to invoke a service interface (e.g., method) of the proxy object. In 920, the proxy object responds to the invocation by performing a JNDI lookup to locate the underlying Java EE resource and invoking the resource in 925. As discussed above, the proxy object may be configured with the JNDI name of the underlying Java EE resource, which enables the proxy to perform the JNDI lookup. The JNDI lookup may return a handle to the Java EE resource, which the proxy object may invoke. Although the proxy object may use the same handle to perform multiple invocations on behalf of the OSGi client, in some embodiments, the proxy object may be configured to perform a new JNDI lookup to acquire an updated handle for each invocation. Thus, the proxy object may ensure that it does not invoke a Java EE resource that has been deleted or otherwise changed.

Figure 10:
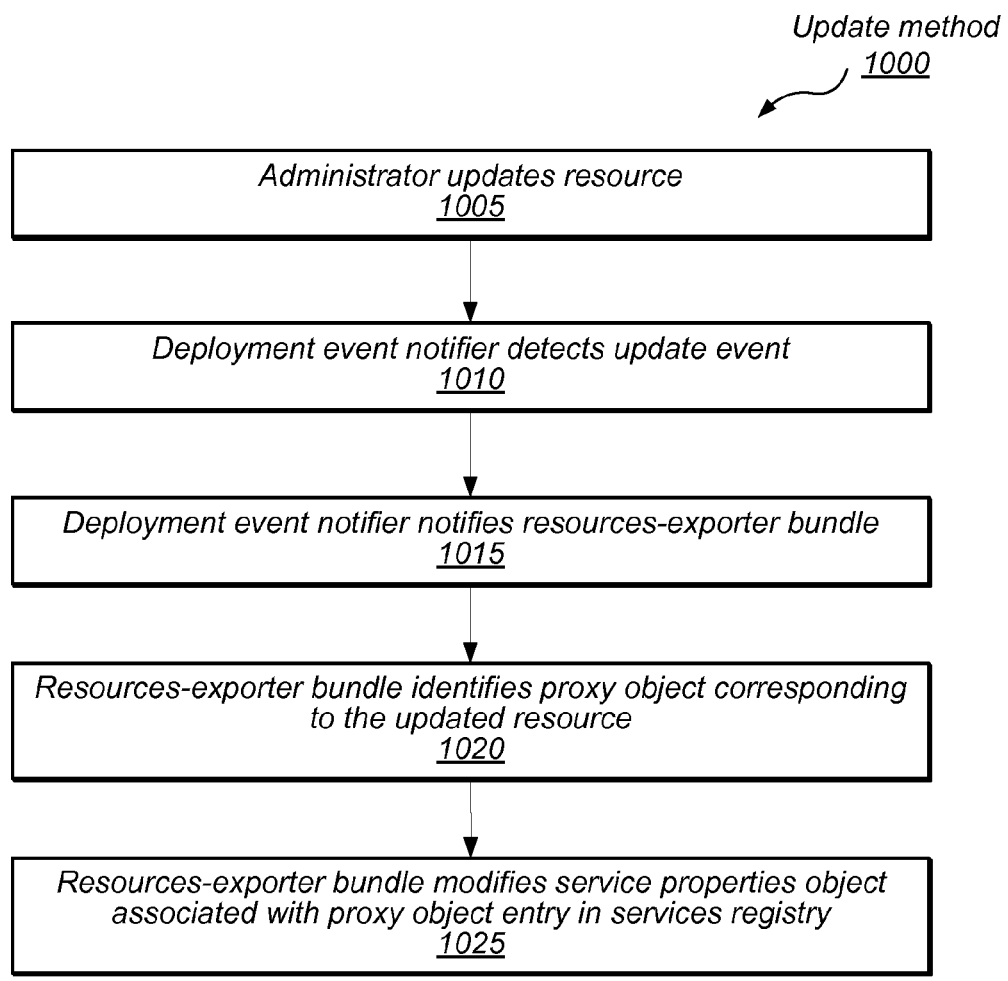
FIG. 10 is a flow diagram illustrating a method for updating a service provided by a Java EE resource, according to some embodiments.

FIG. 10 is a flow diagram illustrating a method for updating a service provided by a Java EE resource, according to some embodiments. Update method 1000 may be executed using a hybrid server, such as system 700.

Update method 1000 may be triggered when an administrator updates a Java EE resource, as in 1005. For example, the administrator may modify the maximum, minimum, or ideal number of connections in a JDBC connection pool of a JDBC resource, such as 745. In some instances, some or all of the modified configuration parameters may be reflected in a service properties object (e.g., 737) corresponding to a proxy of the resource (e.g., 735). Therefore, the system may be configured to update such service properties, as shown in method 1000.

In 1010, the deployment event notifier detects the update event, and in 1015, the notifier notifies the resource-exporter bundle of the update. The notification may include information regarding which properties were update and/or the new values of those properties.

In 1020, the resources-exporter bundle identifies the proxy object corresponding to the updated resource. In 1025, the resources-exporter modifies the service properties object associated with the proxy object's entry in the OSGi services registry. Using system 700 as an example, if an administrator updates a configuration parameter of JDBC resource 745, notifier 725 notifies resources-exporter 715. In response to the notification, resources-exporter 715 determines that proxy object 720 (which corresponds to JDBC resource 745) provides a service that has been modified. Accordingly, resource-exporter 715 may locate proxy object entry 735 (corresponding to proxy object 720) and modify corresponding service properties 737. In some embodiments, service properties 737 may be implemented as an object. In such embodiments, resources-exporter 715 may update the object or replace it with another object. In some embodiments, one or more other components or subcomponents may perform the update.

Figure 11:
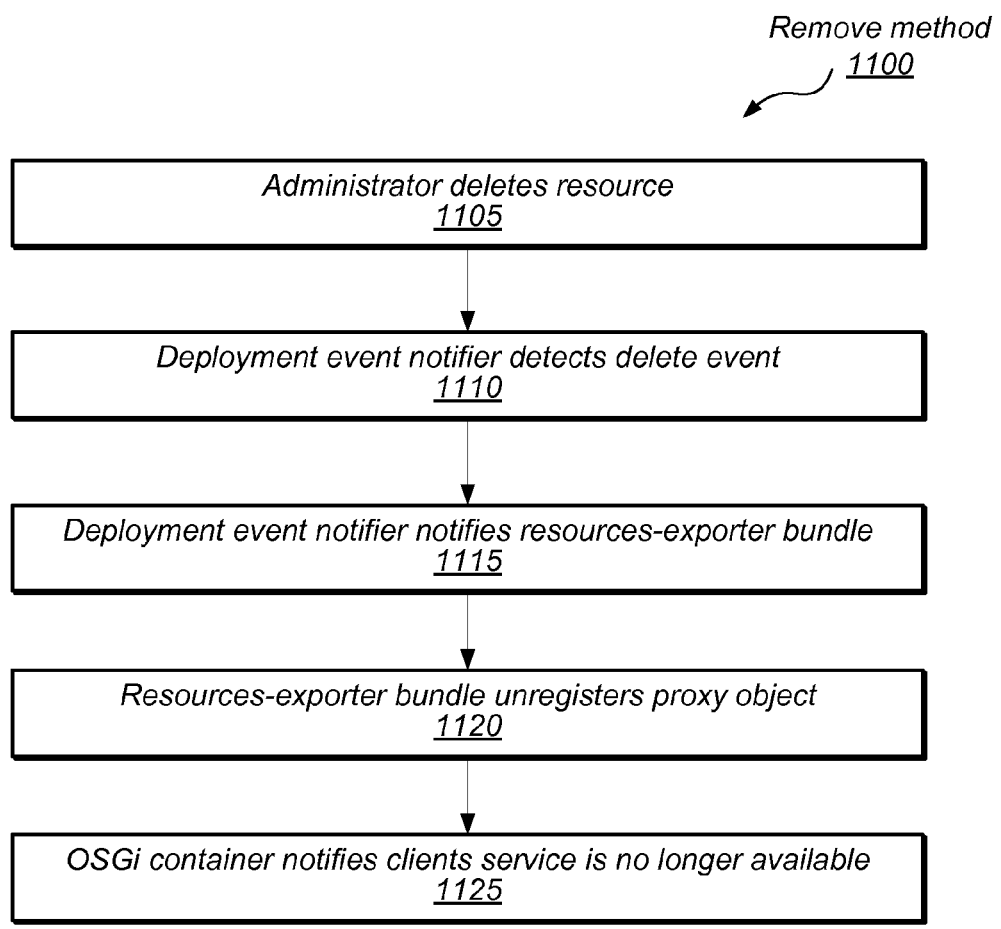
FIG. 11 is a flow diagram illustrating a method for removing a Java EE-backed service from an OSGi registry, according to some embodiments.

FIG. 11 is a flow diagram illustrating a method for removing a Java EE-backed service from an OSGi registry, according to some embodiments. In some embodiments, method 1100 of FIG. 11 may be performed using a hybrid server, such as system 700.

Remove method 1100 may be triggered when an administrator deletes a Java EE resource, as in 1105. In 1110, the deployment event notifier detects the delete event and in 1115, responds by notifying the resources-exporter of the delete event. In 1120, the resources-exporter responds to receiving the delete event by unregistering the proxy object from the OSGi services registry. In some embodiments, the resources-exporter may perform the unregistering operation synchronously with the notification.

In 1125, the OSGi container notifies any clients that currently hold a handle to the proxy object that the service represented by the proxy object is no longer available. In various embodiments, the message may be of a standard type for communication between the OSGi container and OSGi clients. Because OSGi is a dynamic module system, OSGi clients may be configured to respond to such a message by taking appropriate action to avoid any broken dependencies.

Figure 12:
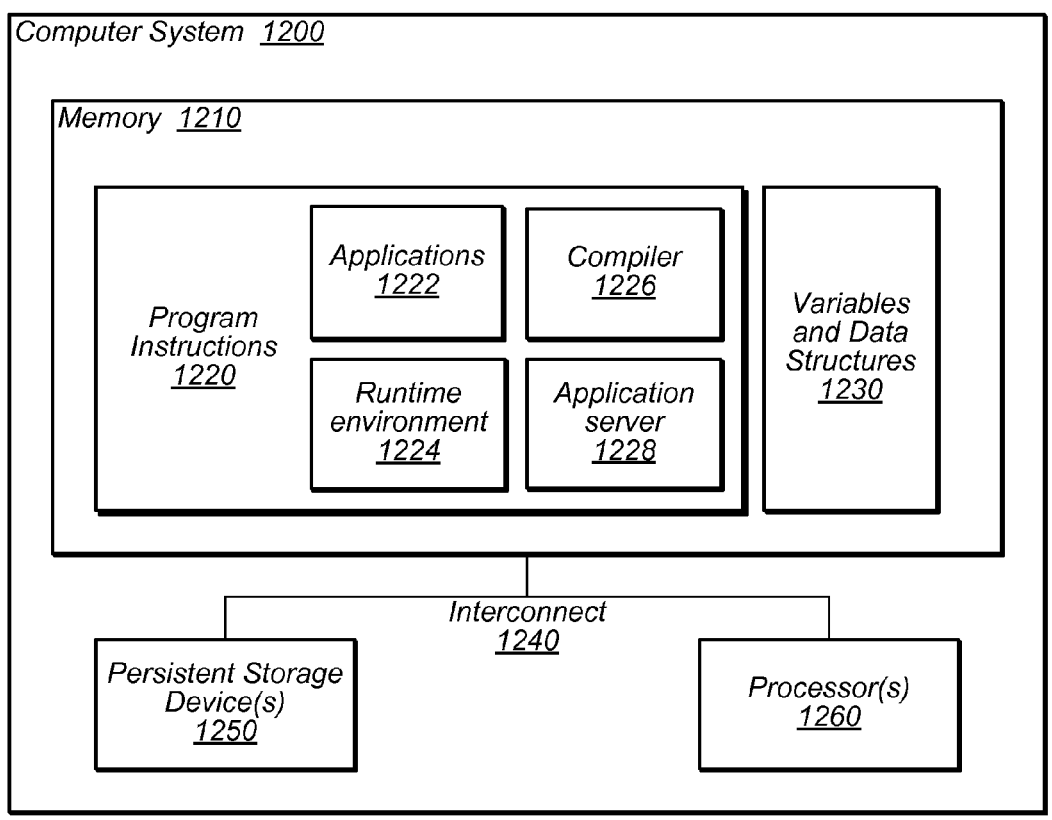
FIG. 12 is a block diagram illustrating a computer system configured to implement a hybrid application server, according to various embodiments.

FIG. 12 is a block diagram illustrating a computer system configured to implement a hybrid application server, according to various embodiments. The computer system 1200 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The hybrid server, applications, dynamic module systems, application component container, and/or code to execute various methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 1200 may include one or more processors 1260, each of which may include multiple cores, any of which may be single or multi-threaded. The computer system 1200 may also include one or more persistent storage devices 1250 (e.g. optical storage, magnetic storage, hard drive, tape drive, solid state memory, etc), which may persistently store, for example, data such as program source code 210, executable code 230, and/or various outputs 230 as shown in FIG. 2.

According to the illustrated embodiment, computer system 1200 may include one or more memories 1210 (e.g., one or more of cache, SRAM, DRAM, RDRAM, EDO RAM, DDR 10 RAM, SDRAM, Rambus RAM, EEPROM, etc.). The one or more processors 1260, the storage device(s) 1250, and the system memory 1210 may be coupled to an interconnect 1240. Various embodiments may include fewer or additional components not illustrated in FIG. 12 (e.g., video cards, audio cards, additional network interfaces, peripheral devices, a network interface such as an ATM interface, an Ethernet interface, a Frame Relay interface, monitors, keyboards, speakers, etc.).

One or more of the system memories 1210 may contain program instructions 1220. Program instructions 1220 may be encoded in platform native binary, any interpreted language such as Java™ byte-code, in any high-level programming language such as C/C++, Java™, etc., or in any combination thereof. Program instructions 1220 may include instructions executable to implement various applications 1222, such as hybrid web applications, application module, and/or application components. Such applications may be executed on an application server, such as 1228.

In the illustrated embodiment, program instructions 1220 include instructions executable to implement compiler 1226, which may be usable to compile source code representations of programs and/or components into an executable form (e.g., native binary or interpreted language). Compiler 1226 may be configured to validate source code for type safety, including for that of injected dependencies, as described herein. In the illustrated embodiment, program instructions 1220 may also include one or more runtime environments 1224. Runtime environments 1224 may include a Java™ runtime, Java EE container, OSGi container, or various runtime support mechanisms as described herein.

In some embodiments, memory 1210 may include any number of in-memory variables and/or data structures, such as 1230. Variables and data structures may comprise any number of variables and/or data structures allocated by executing programs, such as applications 1222, server 1228, compiler 1226, and runtime environments 1224.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
a computer processor;
a memory coupled to the processor and storing program instructions executable by the processor to implement a hybrid application server, wherein the hybrid application server comprises:
an application server container that provides runtime support, for components deployed on the application server container, to access a system-level resource;
a dynamic module container that provides dynamic deployment and discovery support for clients of the dynamic module container separate from the application server container; and
a resources-exporter module deployed on the dynamic module container and configured to:
detect that a system-level resource of the application server container has been deployed; and
in response to detecting that the system-level resource of the application server container has been deployed, register a proxy object for the system-level resource as a service in the dynamic module container, wherein the registered proxy object provides a handle for clients of the dynamic module container to invoke the system-level resource of the application server container.

2. The system of claim 1, wherein the system-level resource corresponds to a pool of connections to a database or to a messaging system or to an enterprise information system.

3. The system of claim 1, wherein:
the system-level resource has been deployed according to a configuration parameter;
registering the proxy object as a service in the dynamic module container comprises associating the configuration parameter with the service as a service property; and
wherein the program instructions are further executable to:
detect that the configuration parameter has been modified; and
in response to the detecting, modify the service property to reflect the modified configuration parameter.

4. The system of claim 1, wherein the proxy object is configured to:
receive an invocation of the service; and
in response to receiving the invocation:
locate the system-level resource using a directory service of the application server container; and
invoke a corresponding interface of the system-level resource.

5. The system of claim 1, wherein the program instructions are further executable to:
detect that the system-level resource is no longer deployed on the application server container; and
in response to the detecting, unregister the proxy object from the dynamic module container.

6. A non-transitory, computer-readable storage medium storing program instructions that when executed by a computer processor implement a hybrid application server comprising:
an application server container that provides runtime support, for components deployed on the application server container, to access a system-level resource;
a dynamic module container that provides dynamic deployment and discovery support for clients of the dynamic module container separate from the application server container; and
a resources-exporter module deployed on the dynamic module container and configured to:

detect that a system-level resource of the application server container has been deployed; and in response to detecting that the system-level resource of the application server container has been deployed, register a proxy object for the system-level resource as a service in the dynamic module container wherein the registered proxy object provides a handle for clients of the dynamic module container to invoke the system-level resource of the application server container.

7. The non-transitory, computer-readable storage medium of claim 6, wherein the system-level resource corresponds to a pool of connections to a database or to a messaging system or to an enterprise information system.

8. The non-transitory, computer-readable storage medium of claim 6, wherein:

the system-level resource has been deployed according to a configuration parameter; and registering the proxy object as a service in the dynamic module container comprises associating the configuration parameter with the service as a service property.

9. The non-transitory, computer-readable storage medium of claim 8, wherein the program instructions are further executable to:

detect that the configuration parameter has been modified; and in response to the detecting, modify the service property to reflect the modified configuration parameter.

10. The non-transitory, computer-readable storage medium of claim 6, wherein the proxy object is configured to:

receive an invocation of the service; and in response to receiving the invocation, invoke a corresponding interface of the system-level resource.

11. The non-transitory, computer-readable storage medium of claim 10, wherein invoking the corresponding interface of the system-level resource comprises locating the system-level resource using a directory service of the application server container.

12. The non-transitory, computer-readable storage medium of claim 6, wherein the program instructions are further executable to:

detect that the system-level resource is no longer deployed on the application server container; and in response to the detecting, unregister the proxy object from the dynamic module container.

13. A computer-implemented method, comprising:

detecting, by a computer, that a system-level resource of an application server container has been deployed, wherein the applicant server container provides runtime support, for components deployed on the application server container, to access a system-level resource; and in response to the detecting, registering, by the computer, a proxy object for the system-level resource as a service in a dynamic module container, wherein the dynamic module container provides dynamic deployment and discovery support for clients of the dynamic module container separate from the application server container, and wherein the registered proxy object provides a handle for clients of the dynamic module container to invoke the system-level resource of the application server container.

14. The computer-implemented method of claim 13, wherein the proxy object is created and registered by a resources-exporter bundle deployed on the dynamic module container.

15. The computer-implemented method of claim 13, wherein the system-level resource corresponds to a pool of connections to a database or to a messaging system or to an enterprise information system.

16. The computer-implemented method of claim 13, wherein:

the system-level resource has been deployed according to a configuration parameter; and registering the proxy object as a service in the dynamic module container comprises associating the configuration parameter with the service as a service property.

17. The computer-implemented method of claim 16, further comprising:

in response to detecting that the configuration parameter has been modified, modifying the service property to reflect the modified configuration parameter.

18. The computer-implemented method of claim 13, further comprising:

the proxy object receiving an invocation of the service, and in response, the proxy object invoking a corresponding interface of the system-level resource.

19. The computer-implemented method of claim 18, wherein invoking the corresponding interface of the system-level resource comprises locating the system-level resource using a directory service of the application server container.

20. The computer-implemented method of claim 13, further comprising:

in response to detecting that the system-level resource is no longer deployed on the application server container, unregistering the proxy object from the dynamic module container.

\* \* \* \* \*

UNITED STATES PATENT AND TRADEMARK OFFICE
CERTIFICATE OF CORRECTION

PATENT NO. : 8,706,881 B2  
APPLICATION NO. : 13/069371  
DATED : April 22, 2014  
INVENTOR(S) : Ramu et al.

It is certified that error appears in the above-identified patent and that said Letters Patent is hereby corrected as shown below:

In the Claims

Column 16, line 23, Claim 1, delete "container ," and insert -- container, --, therefor.

Column 17, line 6, Claim 6, delete "container" and insert -- container, --, therefor.

Signed and Sealed this
Twenty-sixth Day of August, 2014

Michelle K. Lee
*Deputy Director of the United States Patent and Trademark Office*